United States Patent
Ho et al.

(10) Patent No.: US 7,362,759 B2
(45) Date of Patent: Apr. 22, 2008

(54) METHOD AND APPARATUS FOR ENCODING INFORMATION

(75) Inventors: Michael Yo-Yun Ho, Burnaby (CA); Oon-Sim Ang, Vancouver (CA); Barry Kazuto Tsuji, Burnaby (CA); Oreste Basil Varelas, Vancouver (CA)

(73) Assignee: Intel Corporation, Santa Clara, CA (US)

( * ) Notice: Subject to any disclaimer, the term of this patent is extended or adjusted under 35 U.S.C. 154(b) by 624 days.

(21) Appl. No.: 09/965,419

(22) Filed: Sep. 27, 2001

(65) Prior Publication Data

US 2003/0031204 A1    Feb. 13, 2003

Related U.S. Application Data

(63) Continuation-in-part of application No. 09/930,102, filed on Aug. 14, 2001, now Pat. No. 7,042,910, and a continuation-in-part of application No. 09/862,141, filed on May 21, 2001, now Pat. No. 7,158,517.

(51) Int. Cl.
    *H04L 12/56*    (2006.01)
(52) U.S. Cl. .................................. 370/392; 370/537
(58) Field of Classification Search ........ 370/392–393, 370/395.5–395.53, 400–409, 419–421, 539–541
    See application file for complete search history.

(56) References Cited

U.S. PATENT DOCUMENTS

| | | | |
|---|---|---|---|
| 5,210,762 A | 5/1993 | Weeber et al. | |
| 5,465,252 A | 11/1995 | Muller | |
| 5,535,219 A | 7/1996 | Freitas | |
| 5,568,486 A * | 10/1996 | Huscroft et al. | 370/395.2 |
| 5,717,693 A | 2/1998 | Baydar et al. | |
| 5,809,032 A | 9/1998 | Weeber et al. | |
| 5,841,760 A * | 11/1998 | Martin et al. | 370/242 |
| 5,898,887 A | 4/1999 | Hansen | |

(Continued)

FOREIGN PATENT DOCUMENTS

EP    0 705 050 A2    4/1996

(Continued)

OTHER PUBLICATIONS

Fuqiang, S. et al., "A SDH STM-N Processor for Overhead Terminating and PDH Interface," High Technology Letters, vol. 5, No. 1, pp. 25-28, Jun. 1999.

(Continued)

*Primary Examiner*—Chi Pham
*Assistant Examiner*—Thai Hoang
(74) *Attorney, Agent, or Firm*—Grossman, Tucker, Perreault & Pfleger, PLLC

(57) ABSTRACT

Method and apparatus for encoding overhead is described. More particularly, on a receive side channels are multiplexed, and a channel is selected for overhead to process. Transport Overhead and Path Overhead are parsed out and provided to an overhead extractor for encoding. Overhead is encoded according to channel number, frame number, row location and column location ("encoded information"), where either row location or column location is dependent on frame number. On the transmit side, encoded overhead is received at an overhead inserter and parsed back for line output by decoding the encoded information.

20 Claims, 6 Drawing Sheets

U.S. PATENT DOCUMENTS

| | | | |
|---|---|---|---|
| 5,917,818 | A | 6/1999 | Ko et al. |
| 5,923,653 | A | 7/1999 | Denton |
| 5,978,377 | A | 11/1999 | Kim et al. |
| 6,034,947 | A | 3/2000 | Yoshida et al. |
| 6,061,328 | A | 5/2000 | Read et al. |
| 6,201,798 | B1 | 3/2001 | Campanella et al. |
| 6,314,097 | B1 | 11/2001 | Ohara |
| 6,647,004 | B2 | 11/2003 | Allen, Jr. et al. |
| 6,697,386 | B2 | 2/2004 | Sugawara et al. |
| 6,721,315 | B1 | 4/2004 | Xiong et al. |
| 6,765,928 | B1 * | 7/2004 | Sethuram et al. ........... 370/476 |
| 6,895,018 | B1 * | 5/2005 | Klish, II ..................... 370/471 |
| 7,158,517 | B2 | 1/2007 | Varelas et al. |
| 2002/0172225 | A1 | 11/2002 | Ang et al. |
| 2002/0172227 | A1 | 11/2002 | Varelas et al. |
| 2003/0007491 | A1 | 1/2003 | Read et al. |
| 2003/0031204 | A1 | 2/2003 | Burnaby et al. |
| 2004/0174870 | A1 | 9/2004 | Viks et al. |
| 2006/0067314 | A1 | 3/2006 | Ho et al. |

FOREIGN PATENT DOCUMENTS

| | | |
|---|---|---|
| WO | WO 96/41435 | 12/1996 |
| WO | WO 02/095999 A2 | 11/2002 |

OTHER PUBLICATIONS

Hamlin, R. et al., "A SONET/SDH Overhead Terminator for STS-3, STS-3C, and STM-1," IEEE Journal of Solid-State Circuits, vol. 28, No. 3, pp. 276-281, Mar. 28, 1993.

European Patent Office, International Search Report for International Application No. PCT/CA01/01105, 9 pages, Nov. 26, 2002.

European Patent Office, International Preliminary Examination Report for International Application No. PCT/CA01/01105, 8 pages, Sep. 5, 2003.

U.S. Appl. No. 10/954,947, filed Sep. 29, 2004, Ho et al.

"International Search Report and Written Opinion of the Inernational Searching Authority; Dated Jan. 17, 2006; PCT/US2005/035378", (Jan. 17, 2006), 12 pgs.

Office Action for European Patent Application 05 803 674.0-2416 dated Oct. 11, 2007; 5 pages.

* cited by examiner

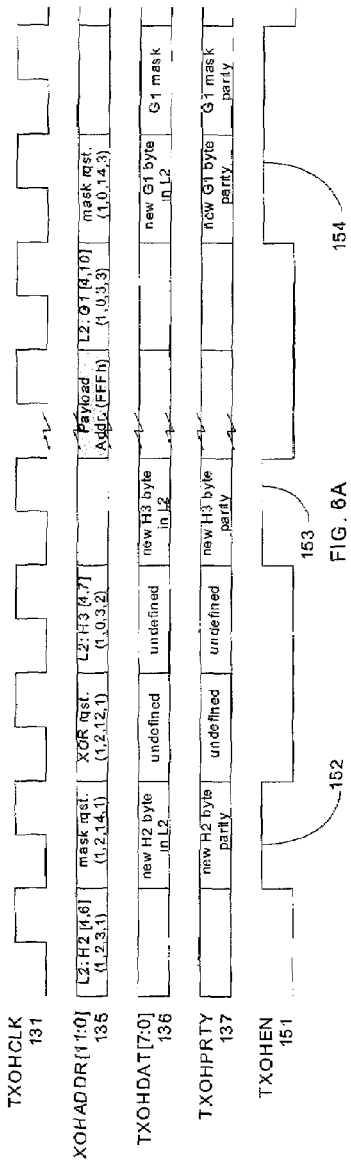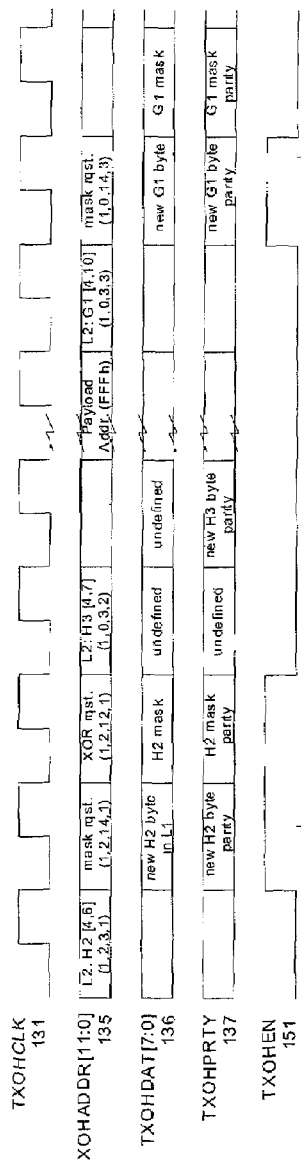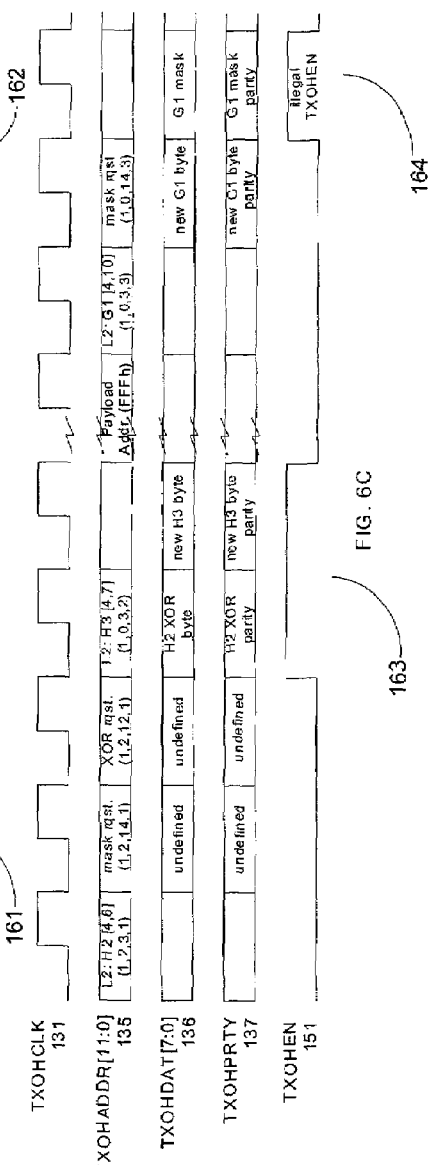

METHOD AND APPARATUS FOR ENCODING INFORMATION

CROSS-REFERENCE TO RELATED APPLICATION(S)

This application is a continuation-in-part of United States Patent Application entitled "Method and Apparatus for Frame-Based Protocol Processing" to Oreste Basil Varelas and Barry Kazuto Tsuji, named inventors herein, application Ser. No. 09/862,141, filed May 21, 2001, now U.S. Pat. No. 7,158,517 and United States Patent Application entitled "Clock Signal Decoupling for Synchronous Operation" to Oon-Sim Ang, Oreste Basil Varelas and Barry Kazuto Tsuji, named inventors herein, application Ser. No. 09/930,102, filed Aug. 14, 2001, now U.S. Pat. No. 7,042,910 and each of which is assigned to the same assignee, both of which are incorporated by reference as th fully set forth herein.

BACKGROUND OF THE DISCLOSURE

1. Field of the Invention

This invention relates to multiplexing information channels to a single channel, and more particularly to multiplexing data channels to a single channel prior to overhead extraction and insertion.

2. Description of Related Art

In telecommunications protocols, data is typically framed or packetized prior to transmission. In each of these frames or packets, there will be a section containing overhead or header information, and a section that contains data. Overhead or header information typically includes information for routing a transmission, among other types of information.

Referring to FIG. 1, there is shown a block diagram of an exemplary embodiment of Synchronous Transport Signal (STS) frame 10 in accordance with the prior art. STS frame 10 may be any of a variety of levels, conventionally where N is equal to 1, 3, 12, 48, 192, or 768 and data rate is N times 51.84 megabits per second (Mbps); although, N may be an integer coventionally from 1 to 768. As shown in FIG. 1, an STS-3 frame 10 is indicated. Frame 10 comprises section overhead (SOH) 18, line overhead (LOH) 19, and in payload area 12 comprise path overhead (POH) 15 and user data area 14 both of synchronous payload envelope (SPE) 13. STS-3 frame 10 may be provided on a separate channels. So, continuing the above example, STS-N may be channelized.

In multi-channel physical layer devices, individual pins associated with each field in each individual channel header are conventionally provided. Other multi-channel physical layer devices have distinct pins for all header information for each channel. Accordingly, depending on the number of channels as well as complexity of a protocol employed, each type of the physical layer devices mentioned above result in a device with significantly large number for a pin count as N is increased. It should be appreciated that this pin count is conventionally doubled owing having both a transmit path and a receive path. Conventionally, both paths have the same number of pins associated with overhead bytes for their respective data path.

Because data rate may vary slightly from one STS channel to the next STS channel, absence of alignment of data causes problems with respect to extracting overhead. One signal may be at 51.84 megabits per second while another data rate on another channel is slightly higher and yet another data rate on yet another channel is slightly lower than that data transmission rate. Accordingly, overhead from such signals is extracted and inserted separately for each data rate-varying channel. In other words, there is an independent extraction port and an independent insertion port for each channel. This, however, uses a substantial number of pins.

Accordingly, it would be desirable to provide an interface with a lower pin count, and more particularly to reduce pin count on both transmit and receive sides.

SUMMARY OF INVENTION

The present invention provides method and apparatus for encoding overhead. More particularly, a method for encoding overhead is provided. Overhead is obtained. A row location encoding, a column location encoding, a frame number encoding and a channel number encoding are provided for the obtained overhead. These encodings are assembled to provide a field of encoded overhead information.

Another aspect of the present invention is an apparatus for encoding transport information. A first overhead processor is coupled to at least one channel and configured to obtain a first portion of transport information from the at least one channel. A second overhead processor is coupled to the at least one channel and configured to obtain a second portion of transport information from the at least one channel. A path pointer processor is coupled to the at least one channel. A third overhead processor is coupled to the path pointer processor and configured to obtain a third portion of transport information from the at least one channel. An overhead extractor is coupled to the first overhead processor, the second overhead processor and the third overhead processor to receive the first portion of transport information, the second portion of transport information and the third portion of overhead. The overhead extractor is configured to encode the first portion of the overhead and the second portion of the overhead and to provide a field of encoded bits representative of a frame number, a channel number and an overhead byte location.

Another aspect of the present invention is an apparatus for encoding overhead information. More particularly, channels coupled to a multiplexer are provided and configured to obtain and select an overhead output. A first overhead processor is coupled to the multiplexer output to receive the overhead from the selected one of the channels. The overhead processor is configured to process out a first portion of overhead from the overhead. A path pointer processor is coupled to the overhead processor. A second overhead processor is coupled to the path pointer processor and configured to process out a second portion of overhead of the overhead. An overhead extractor is coupled to the first overhead processor and the second overhead processor to receive the first portion of overhead and the second portion of overhead. The overhead extractor is configured to encode the first portion of the overhead and the second portion of the overhead and to provide a field of encoded bits representative of a frame number, a channel number and an overhead byte location.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however that the appended drawings illustrate only typical embodiments of this invention and are therefore not to be considered limiting of its scope, for the invention may admit to other equally effective embodiments.

FIGS. 6A through 6C are timing diagrams of exemplary requests of the byte replacement with masking in accordance with aspects of the present invention.

To facilitate understanding, identical reference numerals have been used, where possible, to designate substantially similar or identical elements that are common to the figures.

DETAILED DESCRIPTION OF INVENTION

Figure 2:
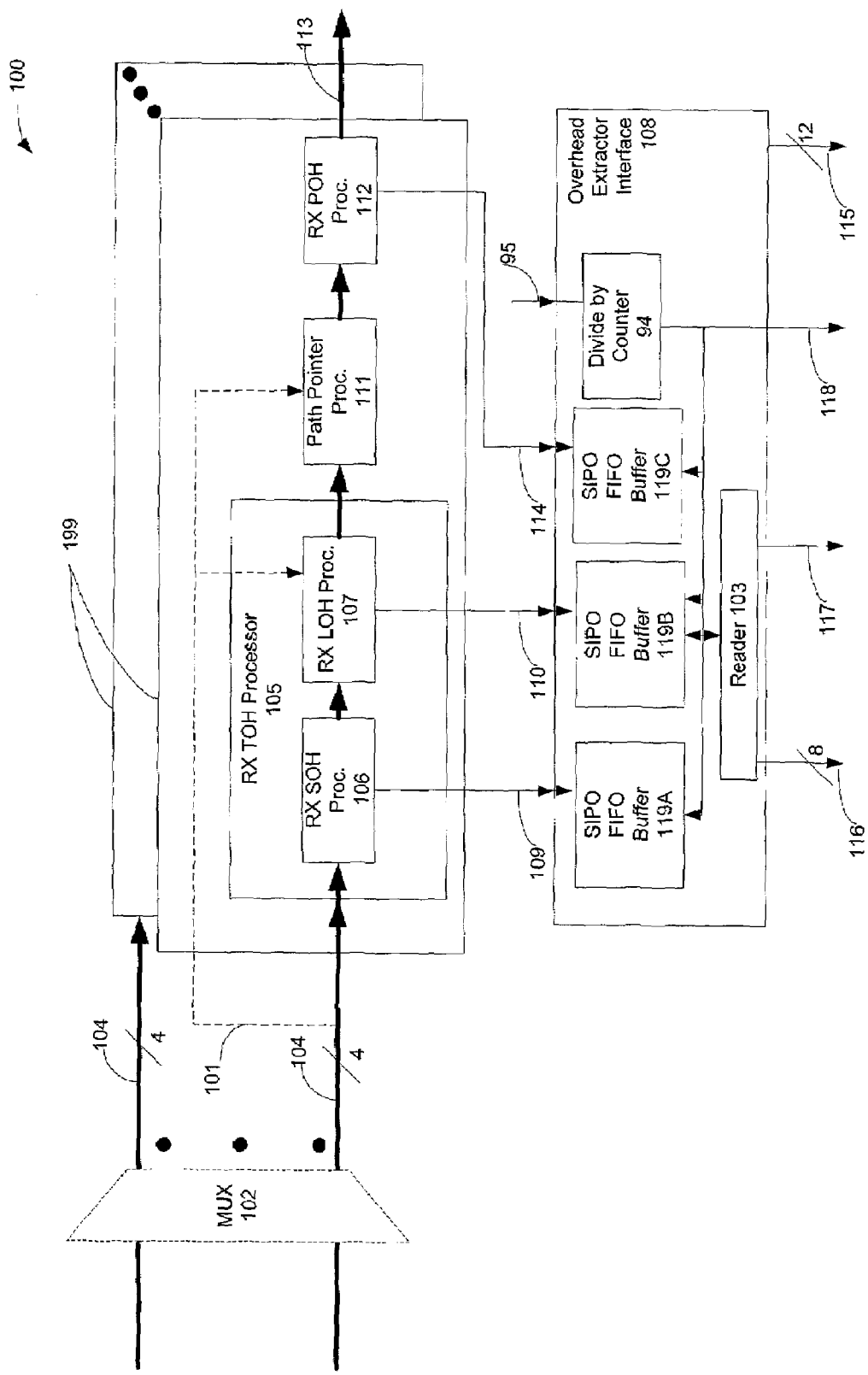
FIG. 2 is a block diagram of an exemplary portion of an overhead extractor interface in accordance with an aspect of the present invention.

Referring to FIG. 2, there is shown a block diagram of an exemplary portion of an overhead interface 100 in accordance with an aspect of the present invention. Overhead interface 100 is used for encoding overhead bytes on a receive side or input path of a network node. For purposes of explanation, a SONET framing device is described. However, it will be appreciated that receive overhead interface 100 may be used with SONET frames, Synchronous Digital Hierarchy (SDH) frames, Asynchronous Transfer Mode (ATM) cells and Internet Protocol (IP) packets, among other types of constructs having overhead or header information.

In this example, each channel 104 comprises four signals, namely, a data signal, a receive clock signal, a frame pulse signal and a data parity signal. Notably, all channels 104 may be processed by a separate processor stage 199 for each such channel for overhead removal and provisioning to buffer 119 along with a line clock signal and a frame pulse signal for each channel. Optionally, a multiplexer may be used to select a channel 104 to process, in which embodiment a single processor stage 199 may be employed. Thus, MUX 102 selects an output associated with a selected channel 104.

Channel signals 104 are provided to receive transport overhead processor 105, and more particularly, to receive (RX) SOH processor 106 of receive (RX) TOH processor 105. RX SOH processor 106 processes SOH data and parity using an incoming clock signal and frame pulse signal from MUX output 104, and provides SOH data and parity information, as well as a frame pulse signal and a receive clock signal, to overhead extractor interface 108 via output 109. Alternatively, channel signals 104 may be directly provided to RX SOH processor 106, RX LOH processor 107 and path pointer processor 111, as illustratively shown by dashed line 101.

RX LOH processor 107 processes LOH and provides LOH data and parity information, as well as a frame pulse and a receive clock pulse signal, to overhead extractor interface 108 via output 110. Path pointer processor 111 processes path pointer overhead to, for example, identify a starting location of POH within an SPE, determine whether filler bits need to be added to an SPE or determine whether an overflow condition exists. Path pointer processor 111 provides POH and SPE information to RX POH processor 112. RX POH processor 112 provides an SPE to a drop bus (not shown) via output path 113 and provides POH data and parity information, as well as a frame pulse signal and a receive clock signal, to overhead extractor interface 108 via output 114.

The number of inputs to overhead extractor interface 108 will be dependent in part on whether information is received serially to interface 108 or whether a serial-to-parallel (SIPO) buffer is used to buffer information from channels 104 in advance of interface 100. Moreover, the number of inputs to interface 108 is dependent on the number of channels 104.

Overhead extractor interface 108 processes SOH, LOH and POH information (hereinafter collectively overhead information) from outputs 109, 110 and 114 which is provided to first-in first-out buffer (FIFO). Optionally, overhead extractor interface 108 may comprise a serial input to parallel output (SIPO) FIFO buffer configured to receive overhead information in serial and clock it out in parallel on a first-in first-out basis with reference to or off of receive system clock signal 95. Also, optionally one or more buffers may be used, as illustratively shown for SIPO FIFO buffers 119A, 119B and 119C.

Processed overhead information from overhead extractor interface 108 is provided as receive overhead address signal 115, which is generated and formatted as described below, receive overhead data signal 116, receive overhead parity signal 117 and receive overhead clock signal 118. For purposes of clarity a 16 channel STS-3 input exemplary embodiment is described. However, fewer or more channels, as well as fewer or more STS levels, may be used in accordance with one or more aspects of the present invention. Receive overhead address signal 115 is 12 bits wide, receive overhead data signal 116 is eight bits wide, receive overhead parity signal 117 is one bit wide, and receive overhead clock signal is one line. Accordingly, 22 separate lines are provided from overhead extractor interface 108 to provide signals 115 through 118. Notably, fewer or more bits may be used to provide receive overhead address signal 115.

TOH and POH overhead bytes, namely, all overhead bytes in a frame, of channels 104 are output in parallel as receive overhead data signal 116, which is one byte wide. Continuing the example of an STS-3 frame for purposes of clarity, there are nine rows and nine columns of TOH in an STS-3 frame. Additionally, there are nine rows and three columns of POH in an STS-3 frame. To uniquely identify a channel number and a location of each overhead byte in an STS-3 frame, a 12-bit addressing scheme is employed for this example with 16 channels. This addressing scheme is reflected in receive overhead address signal 115. Other addressing schemes may be used as long as each byte, frame and channel are uniquely identified.

Figure 3:
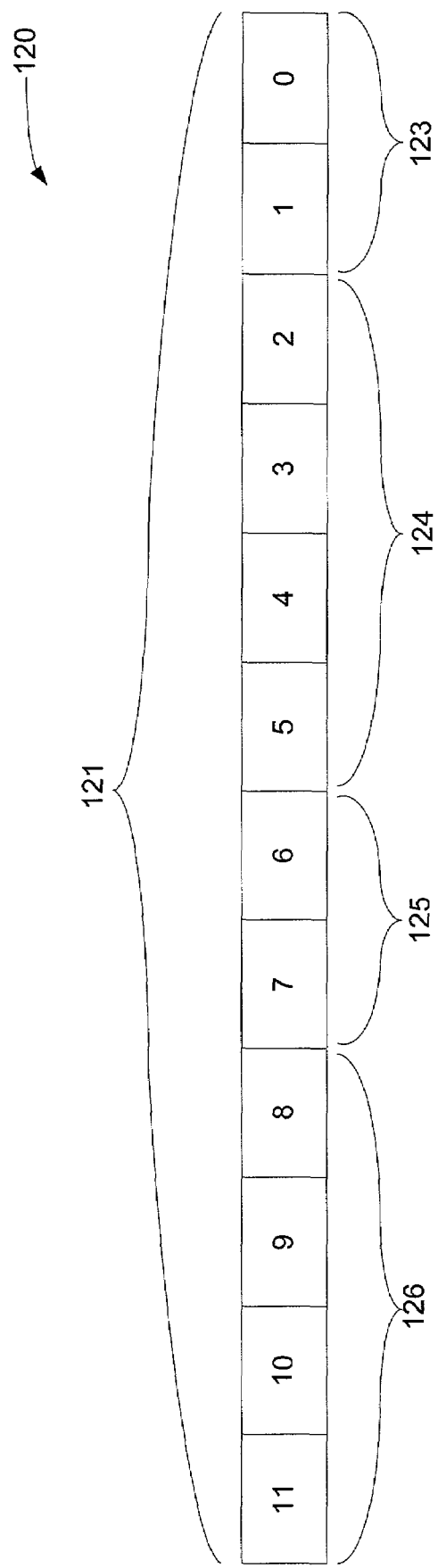
FIG. 3 is a block diagram of an exemplary embodiment of an address identifier for an overhead address signal in accordance with an aspect of the present invention.

Referring to FIG. 3, there is shown a block diagram of an exemplary embodiment of an address identifier 120 for receive overhead address signal 115 (shown in FIG. 2) in accordance with an aspect of the present invention. Address identifier 120 comprises bits 121. Continuing the above example, twelve bits 121, namely, bits 0-11, are used to identify overhead bytes or byte fields. Bits 0 and 1 are used to identify overhead column location. Bits 2-5 are used to identify overhead row location. Bits 6 and 7 are used to identify a frame, which in this example is one of three STS-1 frames of an STS-3 frame, namely, a (STS-1) frame identifier. Bits 8-11 are used to identify a channel, which in this example is one of 16 channels 101, namely, a channel identifier.

With continuing reference to FIG. 3 and renewed reference to FIG. 2, receive overhead address signal 115 may thus be described in terms of the example as a 12 bit field having subfields 123, 124, 125 and 126. A 4-bit overhead row subfield 124 identifies one of nine rows. A 2-bit overhead column subfield 124 identifies one of three TOH columns or a POH column. A 4-bit line subfield 126 identifies one of 16 channels 104. A 2-bit STS-1 address subfield 125 identifies one of three STS-1 frames of an STS-3 frame. Again, it should be understood that fewer more channels may be used, fewer or more STS-1 levels may be used, or other overhead or header information structures may be used.

Continuing the above-described example, with such an addressing scheme each overhead byte of each STS-1 frame of each channel 104 is mapped or encoded, a portion of which is as shown in Table 1. Table 1 lists binary values for each subfield and what such binary values correspond to with respect to channel, frame, column and row.

TABLE 1

| Subfield 126 | Subfield 125 | Subfield 124 | Subfield 123 | Ch. No. | [Row, Column] |
|---|---|---|---|---|---|
| 0000 | 00 | 0000 | 00 | 1 | [1,1] |
| 0000 | 00 | 0000 | 01 | 1 | [1,2] |
| 0000 | 00 | 0000 | 10 | 1 | [1,3] |
| ... | ... | ... | ... | ... | ... |
| 0000 | 00 | 0000 | 11 | 1 | [1,10] |
| ... | ... | ... | ... | ... | ... |
| 1111 | 10 | 1000 | 00 | 16 | [9,7] |
| 1111 | 10 | 1000 | 01 | 16 | [9,8] |
| 1111 | 10 | 1000 | 10 | 16 | [9,9] |
| ... | ... | ... | ... | ... | ... |
| 1111 | 10 | 1000 | 11 | 16 | [9,12] |

In this addressing scheme, it should be noted that columns 1 through 9 are TOH columns, where column sets 1 through 3, 4 through 6 and 7 through 9 are for a first, second and a third STS-1 frame, respectively, of the example of an STS-3 frame, and columns 10, 11 and 12 are POH columns of a first, second and third STS-1 frame, respectively, of the example STS-3 frame. This is indicated in examples [Row, Column] column in Table 1.

Figure 1:
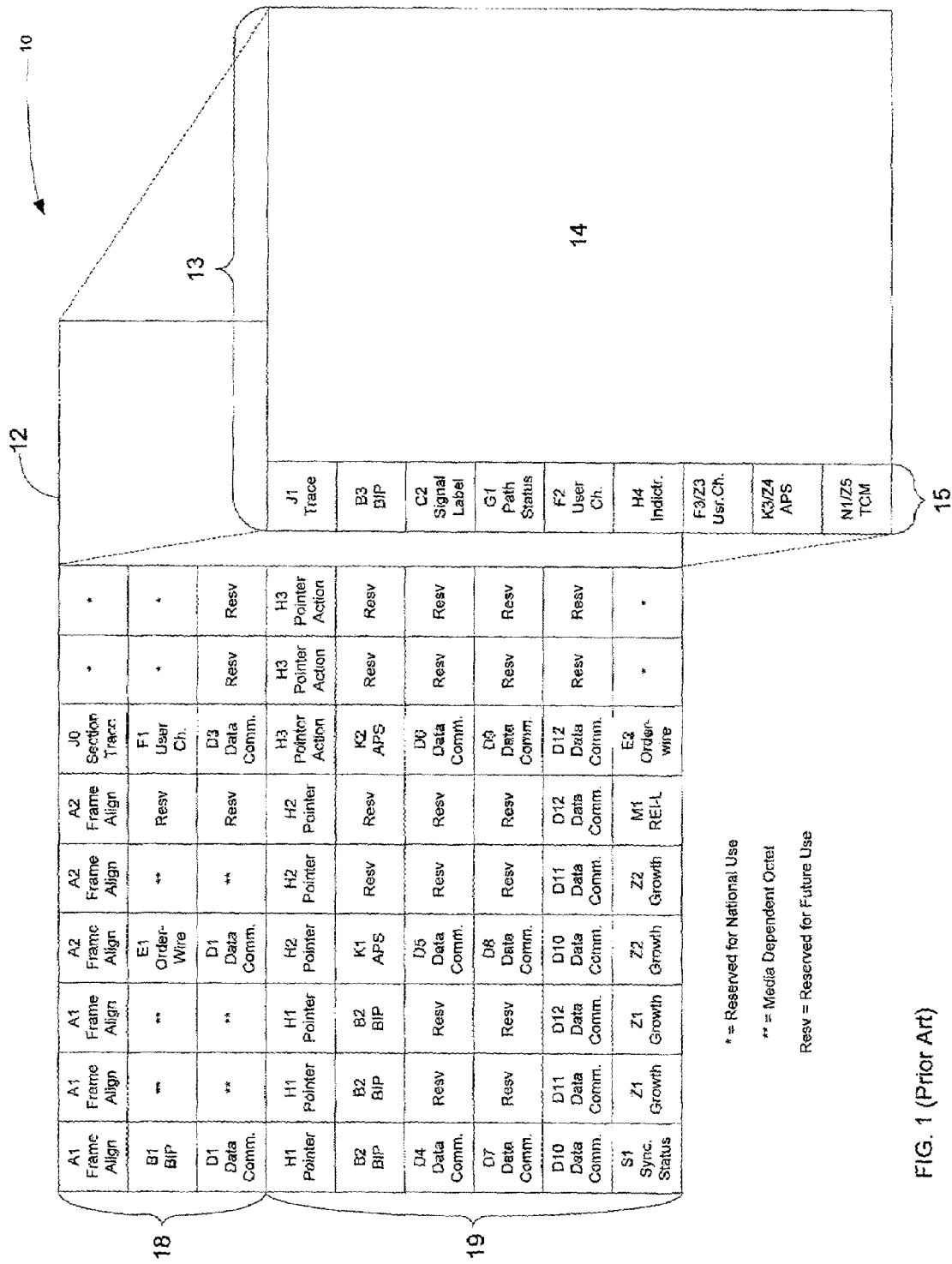
FIG. 1 is a block diagram of an exemplary embodiment of an STS-3 frame in accordance with the prior art.

With continuing reference to Table 1 and renewed reference to FIG. 1, each frame has overhead within a 9-row by 3-column array and a 9-row by 1-column array, and there are three frames 10 in this example. Thus, rows may be uniquely identified by nine numbers, such as binary values 0000 through 1000 as indicated in subfield 124 of Table 1 for example, for any row provided columns are identified to a frame. Columns of an STS-N signal for N greater than one may be identified by four identifiers, for example 00 through 11 binary values as in subfield 123, provided that those values are decoded with a frame, in this example there are three frames identified by binary values 00 through 10 in subfield 125 of Table 1.

The first example underlined in Table 1 is 0000 (for a first channel) 0000 (for a first frame) 00 (for a first row) 00 (for a first column), which when decoded is an A1 overhead byte or byte field [1,1] of SOH of a first STS-1 frame from channel 1. The second example underlined in Table 1 is 1111 (for a last channel) 10 (for a third frame) 1000 (for a ninth row) 11 (for a fourth column), which when decoded is an N1 or Z5 TCM byte or byte field [9,12] of POH of a third STS-1 frame from channel 16.

Alternative encoding schemes may be used in accordance with one or more aspects of the present invention. For example, using rows 1 through 9 as above, columns 1 through 4 could be for a first STS-1 frame, columns 5 through 8 could be for a second STS-1 frame and columns 9 through 12 could be for a third STS-1 frame. This is interesting for decoding because to convert a byte field, for example [1,4], in a first STS-1 frame to its corresponding byte field in a second STS-1 frame, addition of four to subfield 123 is all that is needed. So if a first frame is decoded, no addition is done; if a second frame is decoded, an addition of four to each column value is done, and if a third frame is decoded an addition of eight to each column value is done. This scheme is illustratively shown in Table 2.

TABLE 2

| Subfield 126 | Subfield 125 | Subfield 124 | Subfield 123 | Ch. No. | [Row, Column] |
|---|---|---|---|---|---|
| 0000 | 00 | 0000 | 00 | 1 | [1,1] |
| 0000 | 00 | 0000 | 01 | 1 | [1,2] |
| 0000 | 00 | 0000 | 10 | 1 | [1,3] |
| 0000 | 00 | 0000 | 11 | 1 | [1,4] |
| ... | ... | ... | ... | ... | ... |
| 1111 | 10 | 1000 | 00 | 16 | [9,9] |
| 1111 | 10 | 1000 | 01 | 16 | [9,10] |
| 1111 | 10 | 1000 | 10 | 16 | [9,11] |
| 1111 | 10 | 1000 | 11 | 16 | [9,12] |

Furthermore, alternatively, numbers 1 through 4 may uniquely identify columns for any column provided rows are identified to a frame, for example row sets 1 through 9, 10 through 18 and 19 through 27. Accordingly, decoding schemes be limited to a least order of magnitude. For example, if ten identifiers were needed, then a four-bit system, namely $2^4$ or 16 possible identifiers, would be sufficient. Additionally, unused identifiers may be used for masking as described in more detail below.

Figure 4:
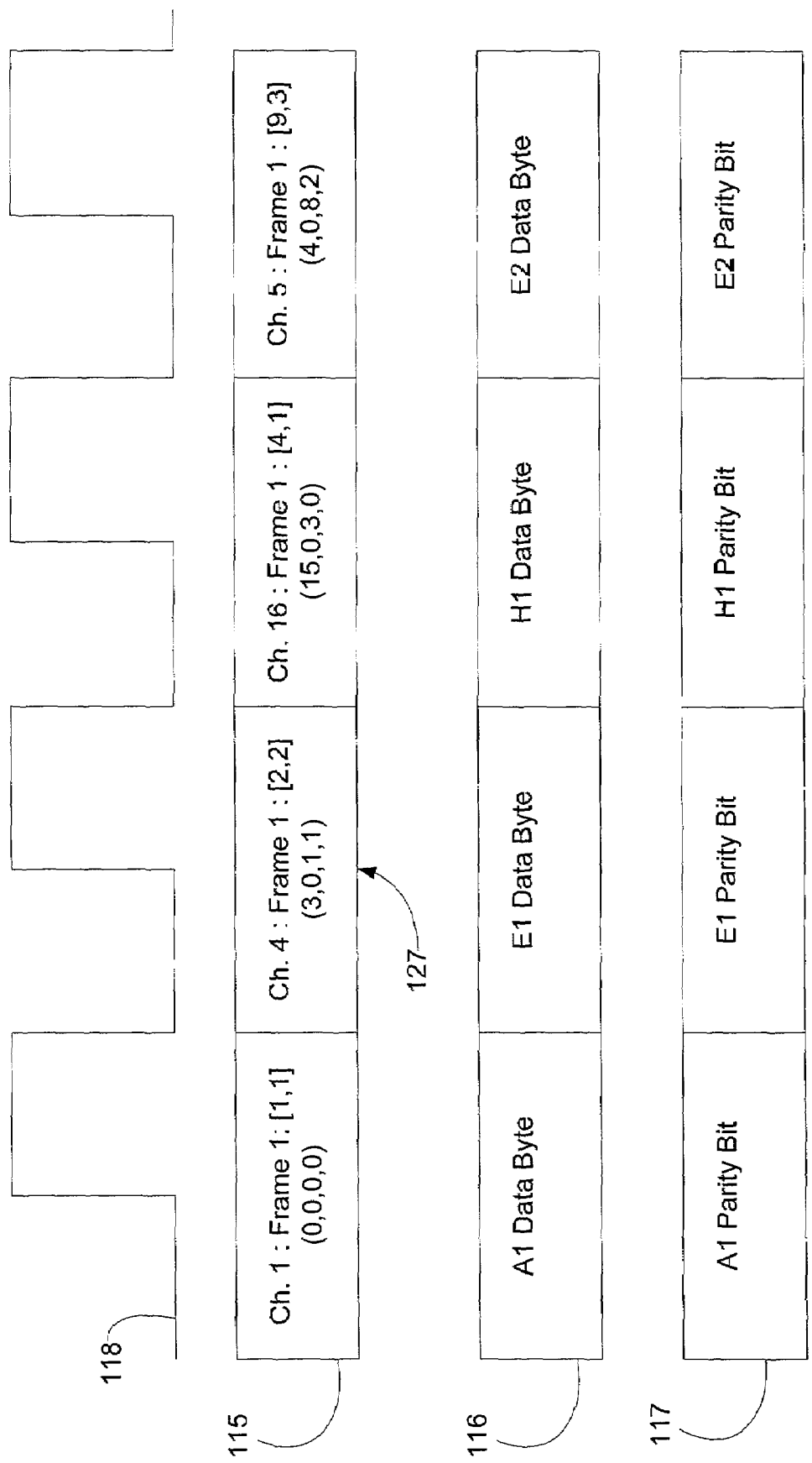
FIG. 4 is an exemplary embodiment of a timing diagram of a portion of receive overhead interface output from an overhead extractor interface in accordance with an aspect of the present invention.

Referring to FIG. 4, there is shown an exemplary embodiment of a timing diagram of a portion of receive overhead interface output, namely from overhead extractor interface 108 (shown in FIG. 2), in accordance with an aspect of the present invention. In FIG. 4, each overhead byte is identified using the above-described example of a 12-bit overhead address identification scheme for an STS-3 frame provided along 16 channels using encoding as in Table 1. However, for clarity, subfields are parenthetically indicated (subfield 126 value, subfield 125 value, subfield 124 value, subfield 123 value) with integer and not in binary. For example, byte 127, an E1 byte of a first STS-1 frame from channel 4 of channels 101, is encoded as (3,0,1,1).

With continuing reference to FIG. 4 and renewed reference to FIGS. 1 through 3, a byte of overhead for a particular line or channel interface is not predetermined. In other words, relationship of signals on channels 104 may not be exactly aligned to a same clock edge owing to differences frequency or phase, among other variables. Thus, for example, not all bytes from an SOH row, nine columns wide, will output sequentially owing to differences in frequency or phase between STS-1 frames delivered on different channels, though adjacent overhead bytes from a same line interface will output sequentially with other possible bytes from other channels interleaved or not interleaved from time-to-time.

Depending in part on percentage of overhead bytes to an entire frame, receive overhead clock signal 118 may be slower in frequency than receive system clock signal 95. For example, if an SPE uses more clock cycles to process than clock cycles used to process overhead, then the period of the clock cycles used on the overhead may be widened. Thus, receive clock signal 95 may be divided by divide by counter 94 to produce receive overhead clock signal 118 with a slower frequency than that of receive clock signal 95.

While not wishing to be bound by theory, it is typically less difficult to align clock edges to data edges for at slower clock speeds, so clocking off a frequency fraction of receive system clock 95 and aligning edges to receive overhead data signal 116 with receive overhead clock signal 118, as well as receive overhead address signal 115 and receive overhead parity signal 117, should result in more accurate processing and interfacing with external devices of slower clock speeds. Additionally, a lower clock speed allows less expensive components, namely, components that do not require higher clock speeds, to be employed.

Figure 5:
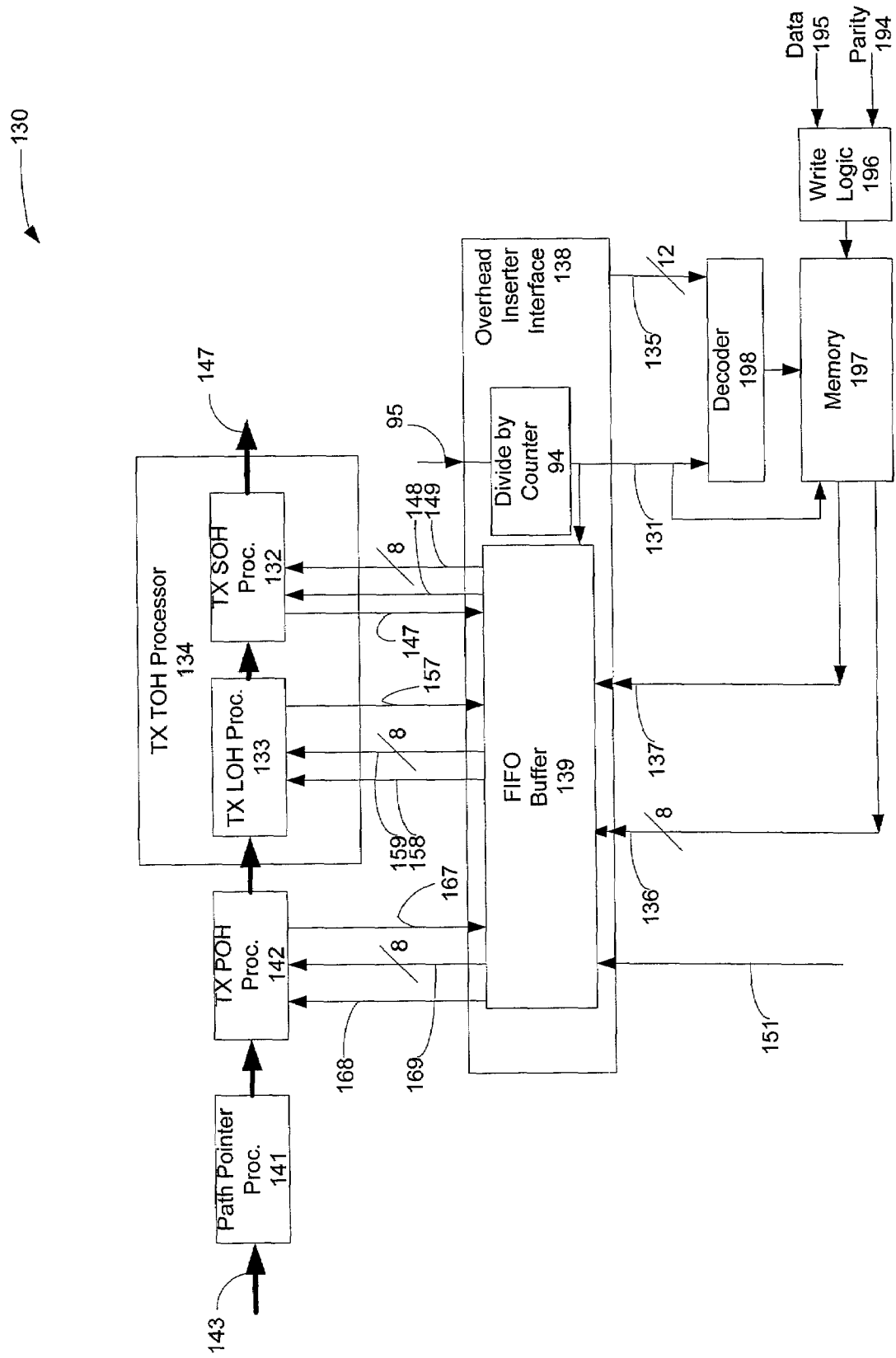
FIG. 5 is a block diagram of an exemplary embodiment of a portion of transmit overhead interface in accordance with an aspect of the present invention.

Referring to FIG. 5, there is shown a block diagram of an exemplary embodiment of a portion of transmit overhead interface 130 in accordance with an aspect of the present invention. Noticeably, transmit overhead interface 130 is similar to receive overhead interface 100 (shown in FIG. 2). However, instead of having an overhead extractor interface 108 (shown in FIG. 2), a transmit path has an overhead inserter interface 138. This is because encoded overhead information is received by overhead inserter interface 138. Overhead inserter interface 138 inserts decoded overhead information as parsed out.

Overhead data signal 195 and overhead data parity signal 194 are provided to write logic 196 for writing to memory 197, which may be a volatile memory such as a random access memory (RAM), a non-volatile memory such as a flash memory or erasable programmable read only memory (EPROM), and the like. Overhead inserter interface 138 provides transmit overhead clock signal 131 and transmit overhead address signal 135 to decoder 198. Decoder 198 decodes the encoded overhead information from signal 135 for accessing overhead data bytes written to memory 197, and in response providing transmit overhead parity signal 137 and transmit overhead data signal 136. Transmit overhead parity signal 137 is similar to receive overhead parity signal 117. Transmit overhead data signal 136 is similar to receive overhead data signal 116. Transmit overhead address signal 135 is similar to receive overhead address signal 115.

After buffering overhead data and parity from signals 136 and 137, a transmission input signal 143 is received to path pointer processor 141. Path pointer processor provides pointer information to transmit (TX) POH processor 142. TX POH processor 142 requests a POH byte by sending a frame pulse signal 167 to buffer 139, and in response buffer 139 provides parity and overhead byte data signals 168 and 169. Overhead byte data signal 168 provides an overhead byte for insertion at a requested location in a frame, or more particularly to form frame overhead. Accordingly, a requested overhead byte is inserted, which is ultimately destined for output stream 147. Notably, buffer 139 may comprise one or more buffers.

TX LOH processor 133 and TX SOH processor 132 of TX TOH processor 134 operate as does TX POH process, except rather than requesting POH overhead bytes for insertion, processors 133 and 132 request LOH and SOH bytes, respectively, for insertion. These requests are made using frame pulse signals 157 and 147. LOH overhead bytes are provided on signal 159 and associated parity is provided on signal 158. SOH overhead bytes are provided on signal 149 and associated parity is provided on signal 148. Notably, signals 169, 159 and 149 may be an eight-bit wide parallel out, as illustratively shown, or a single serial stream. Processors 142, 133 and 132 obtain POH, LOH and SOH overhead data bytes, respectively, for insertion to provide output overhead stream 147.

In the transmit direction, the above-described encoding or addressing of transport information may be expanded to provide additional functions such as byte replacement with masking and inverting (XORing) of bits in the internal overhead byte (prior to any replacement). Essentially, this expanded addressing facilitates transmit overhead interface 130 to receive more information from a device exterior to such an insertion interface 130 using an external interface thereto. Therefore, this additional information is not limited to the sample functions described. For example, additional information may include the number of times to repeat a given byte across consecutive frames or other configuration information.

One embodiment to expand the above-described addressing scheme without increasing the number of bits used in such addressing scheme comprises using unused row identifiers. As there are only 9 rows in a SONET frame and two to the fourth power provides sixteen possible combinations, there are seven additional unused identifiers. Such additional identifiers may be used with masking and XORing as additional functions. In Table 3 for byte replacement, masking and XORing identifiers on an STS-1 basis, rows 10 and 11 are XORed for all columns, rows 12 and 13 for columns 1 and 2 are XORed, rows 12 and 13 for columns 3 and 4 are masked, and rows 14, 15 and 16 are masked for all columns.

TABLE 3

| ROW/COL | 00 1 | 01 2 | 10 3 | 11 4 |
|---|---|---|---|---|
| 0000 | 1 | A1 | A2 | J0/Z0/NU | J1 |
| 0001 | 2 | B1/UD | E1/UD | F1/NU | B3 |
| 0010 | 3 | D1/UD | D2/UD | D3/UD | C2 |
| 0011 | 4 | H1 | H2 | H3 | G1 |
| 0100 | 5 | B2 | K1/UD | K2/UD | F2 |
| 0101 | 6 | D4/UD | D5/UD | D6/UD | H4 |
| 0110 | 7 | D7/UD | D8/UD | D9/UD | F3/Z3 |
| 0111 | 8 | D10/UD | D11/UD | D12/UD | K3/Z4 |
| 1000 | 9 | S1/Z1 | M1/Z2 | E2/NU | N1/Z5 |
| 1001 | 10 | A1 | A2 |  | H4 |
| 1010 | 11 | B1 |  |  | B3 |
| 1011 | 12 | H1 | H2 |  | H4 |
| 1100 | 13 | B2 |  |  | F3/Z3 |
| 1101 | 14 | H1 | H2 |  | G1 |
| 1110 | 15 |  | K1 | K2 | K3/Z3 |
| 1111 | 16 | S1 | M1 |  | N1/Z5 |

Another embodiment to increase the number of bits in for the above-described address scheme is to use extra bits to identify a function to apply to a byte identified by non-extra bit fields, as illustratively shown in Table 4.

TABLE 4

| 13-12 | 11-8 | 7-6 | 5-2 | 1-0 |
|---|---|---|---|---|
| Function | Channel | Frame | Row | Column |

For example, a function as identified by bits 13-12 may be an overhead byte for bits 00, a masking byte for bits 01, and an XOR byte for bits 10 or 11.

Use of addressing or encoding identifiers like the ones described above, facilitates outputting addresses or identifiers sequentially to request information from an exterior device. One sequence of a request for "inserting a byte with masking" may be: (i) Overhead inserter interface 138 outputs an address 135 to request an overhead byte; (ii) overhead inserter interface 138 requests for a mask, which is the same size as such overhead byte requested, such as 8-bits; and (iii) insertion is done only for those bits of such overhead byte requested that have a corresponding mask bit set, for example set to 1.

FIGS. 6A through 6C are timing diagrams of exemplary requests of the above-described byte replacement with masking in accordance with an aspect of the present invention. Referring to FIGS. 5, 6A, 6B and 6C, transmit overhead enable signal 151 is provided to overhead inserter interface 138 to enable overhead inserter interface 138 to transmit overhead, and thus transmit overhead enable signal 151 is used for masking. In FIG. 6A, H2 and H3 value replacement and G1 masking are illustratively shown when transmit overhead enable signal 151 is active or logic high at locations 152, 153 and 154, respectively. In FIG. 6B, H2 masking and G1 value replacement are illustratively shown when transmit overhead enable signal 151 is active or logic high at locations 161 and 162, respectively.

In FIG. 6C, H2 XORing and H3 value replacement are illustratively shown when transmit overhead enable signal 151 is active or logic high at location 163. With continued reference to FIG. 6C, when address signal 135 equals (1,2,12,1), row number is 12 and column number is 1. This corresponds to an H2 XOR byte request in Table 3. This H2 XOR byte is transferred in the next clock cycle via transmit overhead data signal 136, and it is a valid XOR byte since transmit overhead enable signal 151 is asserted high during such transfer. An illegal transmit overhead enable operation 164 is illustratively shown too for purposes of comparison.

For purposes of illustration, a comparison with respect to the number of pins used in accordance with the present invention as compared with the prior art is provided. As shown by an example of a 16 channel by STS-3 frame structure, a total number of overhead associated pins for an integrated circuit chip is receive overhead pins plus transmit overhead pins. In the above-described example, there are 12 pins associated with transmit overhead address signal 135, eight pins associated with transmit overhead data signal 136, one pin associated with transmit overhead clock signal 131 and one pin associated with transmit overhead parity signal 137 and one pin for transmit enable or a total of 23 pins on the transmit side. An additional 22 pins on the receive side, namely, a 12 pins for receive overhead address signal 115, eight pins for receive overhead data signal 116, one pin for receive overhead parity signal 117 and one pin for receive overhead clock signal 118, are added to the transmit side pins for a total of 45 pins. If we compared this with prior art approaches for a similar embodiment of 16 channels by an STS-3 frame, the total number of pins may be as high as 3×3×16×2, plus one for transmit enable, for a total of 289 pins, where 3×3×16×2 is three pins for SOH, LOH and POH times three pins for each STS-1 frame times 16 pins for each channel times two to account for both the transmit and receive sides.

By having fewer pins, semiconductor manufacture is enhanced both in terms of cost, as well as manufacturability. Additionally, creating circuits on a printed circuit board or other membrane is enhanced by having fewer traces with which to contend.

Although the teachings of the present invention that have been shown and described in detail herein, those skilled in the art can readily devise other varied embodiments that still incorporate the teachings and do not depart from the scope and spirit of the invention.

What is claimed is:

1. An apparatus for encoding transport information, comprising:
   at least one channel;
   a first overhead processor coupled to the at least one channel and configured to obtain a first portion of transport information from the at least one channel;
   a second overhead processor coupled to the at least one channel and configured to obtain a second portion of transport information from the at least one channel;
   a path pointer processor coupled to the at least one channel;
   a third overhead processor coupled to the path pointer processor and configured to obtain a third portion of transport information from the at least one channel; and
   an overhead extractor coupled to the first overhead processor, the second overhead processor and the third overhead processor to receive the first portion of transport information, the second portion of transport information and the third portion of overhead, the overhead extractor configured to encode the first portion of the overhead and the second portion of the overhead and to provide a field of encoded bits representative of a frame number, a channel number and an overhead byte location.

2. The apparatus of claim 1 wherein the byte location is given by a row number and a column number.

3. The apparatus of claim 2 wherein the row number is independent of the frame number.

4. The apparatus of claim 2 wherein the column number is independent of the frame number.

5. The apparatus of claim 2 wherein the field of encoded bits is provided from the overhead extractor in parallel.

6. The apparatus of claim 5 wherein the first overhead processor provides a data byte and a parity bit in parallel along with the field of encoded bits.

7. The apparatus of claim 5 wherein the first overhead processor provides the field of encoded bits with a clock signal.

8. The apparatus of claim 7 wherein the clock signal is provided by dividing a system clock signal.

9. The apparatus of claim 1 wherein the first portion of transport information consists of Section Overhead, the second portion of transport information consists of Line Overhead, and the third portion of transport information consists of Path Overhead.

10. The apparatus of claim 1 wherein the first portion of transport information consists of Regenerator Section Overhead, the second portion of transport information consists of Multiplex Section Overhead, and the third portion of transport information consists of Path Overhead.

11. An apparatus for encoding overhead, comprising:
    a plurality of channels;
    a multiplexer coupled to the plurality of channels to receive overhead and configured to select a channel for output of overhead on the channel selected;
    a first overhead processor coupled to the multiplexer output to receive the output of overhead from the channel selected, wherein the first overhead processor is configured to process out a first portion of overhead from the output of overhead;
    a path pointer processor coupled to the first overhead processor; a second overhead processor coupled to the path pointer processor and configured to process out a second portion of overhead from the output of overhead; and an overhead extractor coupled to the first overhead processor and the second overhead processor to receive the first portion of overhead and the second portion of overhead, the overhead extractor configured to encode the first portion of the overhead and the second portion of the overhead and to provide a field of encoded bits representative of a frame number, a channel number and an overhead byte location.

12. The apparatus of claim 11 wherein the byte location is given by a row number and a column number.

13. The apparatus of claim 12 wherein the row number is independent of the frame number.

14. The apparatus of claim 12 wherein the column number is independent of the frame number.

15. The apparatus of claim 12 wherein the field of encoded bits is provided from the overhead extractor in parallel.

16. The apparatus of claim 15 wherein the first overhead processor provides a data byte and a parity bit in parallel along with the field of encoded bits.

17. The apparatus of claim 15 wherein the first overhead processor provides the field of encoded bits with a clock signal.

18. The apparatus of claim 17 wherein the clock signal is provided by dividing a system clock signal.

19. The apparatus of claim 11 wherein the first portion of overhead comprises Transport Overhead, and the second portion of overhead comprises Path Overhead.

20. The apparatus of claim 11 wherein the first portion of overhead comprises Section Overhead, and the second portion of overhead comprises Path Overhead.

* * * * *